(12) United States Patent
Rowland et al.

(10) Patent No.: US 9,541,224 B2
(45) Date of Patent: Jan. 10, 2017

(54) METHOD OF MANUFACTURING COILED TUBING USING MULTI-PASS FRICTION STIR WELDING

(71) Applicant: Global Tubing LLC, Dayton, TX (US)

(72) Inventors: Raymond Rowland, Dayton, TX (US); Mark Wadzeck, Dayton, TX (US); Rodney Bond, Dayton, TX (US)

(73) Assignee: GLOBAL TUBING, LLC, Dayton, TX (US)

( * ) Notice: Subject to any disclaimer, the term of this patent is extended or adjusted under 35 U.S.C. 154(b) by 0 days.

(21) Appl. No.: 13/776,137

(22) Filed: Feb. 25, 2013

(65) Prior Publication Data

US 2014/0027497 A1     Jan. 30, 2014

Related U.S. Application Data

(63) Continuation of application No. 13/544,347, filed on Jul. 9, 2012, now abandoned, and a continuation of application No. 13/302,627, filed on Nov. 22, 2011, now abandoned, and a continuation of application No. 13/077,030, filed on Mar. 31, 2011, now abandoned, and a continuation of application No. 12/857,890, filed on Aug. 17, 2010, now abandoned.

(60) Provisional application No. 61/234,432, filed on Aug. 17, 2009.

(51) Int. Cl.
| | |
|---|---|
| *B23K 20/12* | (2006.01) |
| *F16L 9/00* | (2006.01) |
| *F16L 9/02* | (2006.01) |
| *B23K 31/02* | (2006.01) |
| *F16L 9/16* | (2006.01) |
| *F16L 11/16* | (2006.01) |

(52) U.S. Cl.
CPC .............. *F16L 9/02* (2013.01); *B23K 20/122* (2013.01); *B23K 31/027* (2013.01); *F16L 9/165* (2013.01); *F16L 11/16* (2013.01)

(58) Field of Classification Search
USPC ........................................ 228/2.1, 2.3, 112.1
See application file for complete search history.

(56) References Cited

U.S. PATENT DOCUMENTS

| | | | | |
|---|---|---|---|---|
| 5,794,835 | A * | 8/1998 | Colligan et al. | 228/2.1 |
| 6,161,751 | A * | 12/2000 | Smith et al. | 228/125 |
| 6,230,957 | B1 * | 5/2001 | Arbegast et al. | 228/112.1 |

(Continued)

FOREIGN PATENT DOCUMENTS

| | | | | |
|---|---|---|---|---|
| JP | 60106672 | A | * | 6/1985 |
| JP | 08057640 | A | * | 3/1996 |
| JP | 2003112271 | A | * | 4/2003 |

*Primary Examiner* — Devang R Patel

(57) ABSTRACT

A method for manufacturing a long length of coiled metal tubing or the like using friction stir welding. Successive lengths of metal strip are friction stir welded using a three-pass welding technique to eliminate any edge defects in the resulting strip. The method includes one or more three-pass friction stir welding routines, each of which includes a first pass performed using a tool having a first rotational direction and a spiral bit pattern corresponding to the first rotational direction; a second pass using a tool having a second rotational direction and a spiral bit pattern corresponding to the second rotational direction; and a third pass using a tool having said second rotational direction and a spiral bit pattern corresponding to the second rotational direction.

8 Claims, 2 Drawing Sheets

(56) References Cited

U.S. PATENT DOCUMENTS

| | | | |
|---|---|---|---|
| 7,455,211 B2* | 11/2008 | Kay | 228/112.1 |
| 2006/0157539 A1* | 7/2006 | DuBois | 228/144 |
| 2010/0096438 A1* | 4/2010 | Sato | B23K 20/1225 |
| | | | 228/114 |

* cited by examiner

METHOD OF MANUFACTURING COILED TUBING USING MULTI-PASS FRICTION STIR WELDING

FIELD OF THE INVENTION

The present invention relates generally to methods of manufacturing coiled tubing, and in particular, to a method of manufacturing coiled tubing that eliminates edge defects that might otherwise be caused by friction stir welding processes.

BACKGROUND

Metallic coiled tubing is used in the oil and gas industry for many applications, especially in the drilling and workover areas. Such tubing is manufactured in a variety of ways, for example, using a continuous milling operation that utilizes paired strips of adjoining tube stock cut to appropriate widths in order to later form desired diameters of coiled tubing. The strips are typically joined together by a welding process that causes the metal to change phase into either a molten or liquefied state, and filler metal or a welding wire is then used to form a weld puddle, thereby providing a suitable weld.

These welded strips are then run continuously through an electronic resistance welding ("ERW") tube mill to produce a "string" of tubing that can be as much as 20,000 feet in length. The welded string is then placed on a large truck that sets up over a well, and the tubing is repeatedly reeled in and out of the well as various fluids and acids are pumped through the tubular housing.

As many as 15-20 strip welds are required in order to form a long string of tubing (e.g., a thousand feet or more) using this method. As the tubing is forced into and out of the well, it is usually coiled and uncoiled around a truck reel, and consequently the wall of the tubing is stressed and becomes fatigued as the tubing is bent and subjected to flexing and/or high internal pressures.

As those of skill in the pertinent arts will readily appreciate, the welded strip joint has always been the weak link in this process. If the joint or weld fails or ruptures, the results can be catastrophic. At minimum, the tubing can break and fall into the well and delay operations; in some cases, the string becomes tangled or jammed within the well and cannot be removed, thereby jeopardizing the viability of the entire well.

Using current manufacturing methods, it is not possible to create a welded joint having the same molecular structure as the parent material, because all previously employed welding techniques require application of a weldment material (such as wire or the like) in order to complete the weld.

A detailed description of one process for producing a length of coiled tubing can be found in U.S. Pat. No. 5,191,911. In the '911 patent, lengths of metal strip stock are successively drawn from a number of supply coils, and then joined end-to-end to form a composite strip that is fed through a tubing mill. The trailing end of one length and the leading end of the next successive length are cut at supplementary angles, one of which is usually an acute angle. The cut edges are then welded together, and the welded areas are finished to remove excess weldment.

This method frequently involves temporarily extending the width of the edges of the strip at the ends of the weld joint by affixing tabs at the ends of the joint. The tabs serve as temporary heat sinks useful for dissipating heat created during the welding process, and also provide a path for the weldment beyond the edges of the joined strips of metal. After the weld is completed, the tabs are removed during a finishing process. Weldment formed on the surface of the weld must then be removed prior to the tubing being rolled.

The weld is subsequently normalized, so that the heat-affected zone adjacent to the weld returns to nearly the same grain structure as that of the rest of the yet unformed strip. At this point, the composite strip is run through a tubing mill to form seam welded tubing.

Turning for a moment to a seemingly unrelated welding concept, friction stir welding ("FSW") is a solid-state process by which metals or other materials are joined without the use of fusion or filler materials. FSW has been used in the past to join light-weight metals; most commonly, only aluminum and other highly malleable metals have been welded in this manner. Welds created through FSW result from the combination of frictional heating and mechanical deformation, and do not require application of external weldment material such as welding wire. A detailed description of the FSW process may be found in U.S. Pat. No. 5,460,317.

FSW is most often used when the application requires the characteristics of the resulting material to remain as unaltered as possible. In FSW, two pieces of material are butted together and rigidly clamped to prevent the joint faces from being forced apart. To ensure a quality weld, run-on and run-off tabs are used to permit the starting and stopping of a weld beyond the edge of the metal.

A cylindrical rotary tool with an attached probe is rotated and traversed across (and to a partial extent through) the desired joint region. Significant frictional heat is generated during this process, thereby causing the opposed pieces of metal to temporarily enter into a plasticized and deformable condition while apparently still retaining a solid state. As the rotating probe is traversed along the joint line, the newly plasticized portion is spread along the joint. When the probe is removed, the plasticized region quickly cools, thereby joining the two pieces of metal.

Since there is no melting of an associated weld wire, the heat-affected zone of a friction stir weld is practically eliminated after the process has been completed. This contrasts with the prior art methodology of the '911 patent, in which the weldment-filled, heat-affected zone often comprises the failure point for a given string. Also, since with friction stir welding there is no need for filler wire, there is never any corresponding chemical discontinuity as is associated with the prior art. In short, the hardness variation across a FSW weld is very uniform, thereby eliminating the need to post-heat-treat, as is frequently required with ordinary welding.

To date, however, small edge defects (e.g., minor but noticeable deformations) have frequently been observed after friction stir welding, especially on the advancing side of the tool when welding across a run-on tab, as well as on the retreating side of the tool when traversing a run-off tab, after the tool is rotated across the desired joint region.

These defects are created when the FSW tool traverses the edge of a metal sheet and the flow direction of the tool pulls neighboring material into the structure. Through prior unsuccessful attempts to cure this problem, those of skill in the art have learned that the defect size can be reduced, though not eliminated, through various adjustments in the weld parameters.

To completely eliminate the defects, however, a repair procedure is required to that will consume the deformations. While in many applications of FSW, the minor defects are of little to no consequence, in applications such as in the oil and gas industry, it is extremely important that there are virtually no defects in the finished tubing, as high-temperature, high-pressure fluid flow and other mechanical stresses will eventually result in a localized damaging effect that can ultimately destroy the integrity of associated tubulars.

There is, therefore, a long-felt but unmet need for coiled tubing manufacturing methods that admit to production of continuous strings of tubing, while avoiding the edge deformation and excess weldment issues of the prior art.

SUMMARY OF THE INVENTION

A method of manufacturing coiled tubing is provided, the method including at least the following steps: aligning end portions of two sheets of metallic parent stock so that a flush seam is established therebetween; attaching a run-on tab to a first side edge surface of each of the two sheets of aligned parent stock; attaching a run-off tab to a second side edge surface of each of the two sheets of aligned parent stock; making a first friction stir welding pass, traversing the run-on tab, the seam, and the run-off tab, using a tool rotating in a first rotational direction, thereby causing the seam portion to temporarily plasticly deform; making a second friction stir welding pass, traversing the run-off tab, the seam, and the run-on tab, using a tool rotating in a second rotational direction, while the seam portion remains plasticly deformed, thereby initiating repair of any defects formed along the side edge surfaces of the aligned parent stock; making a third friction stir welding pass, traversing the run-on tab, the seam, and the run-off tab, using a tool rotating in the second rotational direction, while the seam remains plasticly deformed, thereby completing repair of any defects formed along the side edge surfaces of the aligned parent stock; and allowing the seam to cool in such a manner that the two portions of parent stock metal are thereafter seamlessly joined.

DETAILED DESCRIPTION

The present invention overcomes the deficiencies in the prior art by providing an improved, nearly flawless weld joint that eliminates the need to clean or re-finish the resulting interior weld surface. The FSW methods described herein admit to production of a long, continuous loop of coiled tubing without creating excess weldment, and without compromising the molecular integrity of the parent feed stock.

In contrast to the prior art, the lengths of strip stock do not require cutting or trimming at supplementary angles. Instead, the trailing end of one length and the leading end of the next successive length are simply butted until flush and then welded together using a friction stir welding technique that utilizes at least three successive passes, including two deformity repair passes, in order to repair and remove all edge defects created during the initial weld pass.

Figure 1:
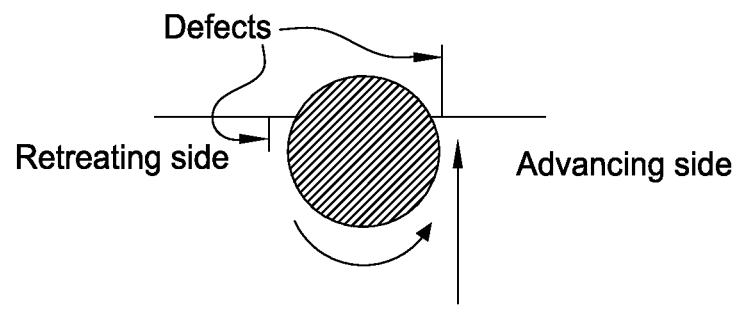
FIG. 1 is a schematic representation of metal flow into and away from the edge of the metal strip, as an FSW tool traverses through the tab and onto the edge of a metal strip while rotating in a counterclockwise manner.

As seen in FIG. 1, metal flows into and away from the edge of the metal strip when an FSW tool traverses through the tab and onto the edge of a metal strip. In this embodiment, the FSW is rotated in a counterclockwise manner, though those of ordinary skill in the pertinent arts will appreciate that the initial rotational direction is arbitrary with respect to the ultimate efficacy of the process, so long as the initial pass rotation direction and the direction of subsequent repair passes are reversed with respect to one another. For purposes of this application, therefore, the initial direction in which the FSW tool rotates is arbitrary, and not dependent upon any molecular curl issues or the like, and other tool rotation combinations are possible within the spirit and scope of the invention as described and claimed herein.

In one specific though non-limiting embodiment, a full-penetration friction stir weld across a complete width of a sheet of 0.019 inch thick HSLA-90 steel utilizes run-on and run-off tabs, and a FSW tool traverses the metal sheet at a rate of around 300 rpm and 3 inches/minute, though again, these specific materials and dimensions are provided for illustrative purposes only, and are not limitative of the method claimed below.

Figure 2:
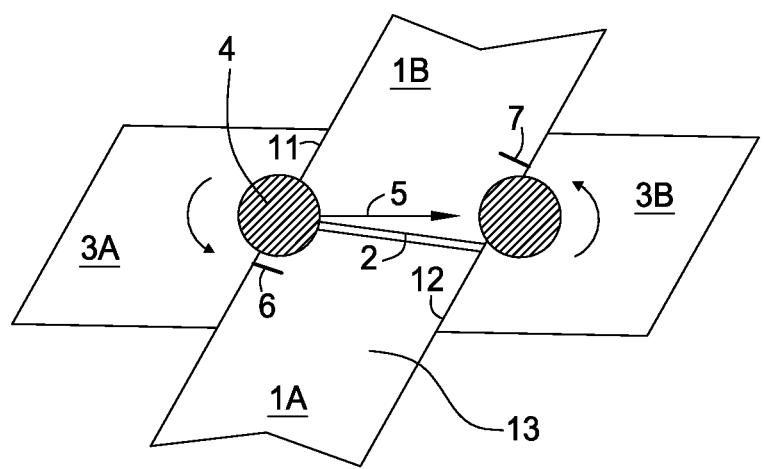
FIG. 2 is a schematic representation of a first pass as the FSW tool traverses through the joint region between two abutting strips; defects created across the run-on and run-off tabs are also depicted.

FIG. 2 shows how the first-pass friction stir weld 5 through joint 2 is made. Two sheets of metal strip stock 1A and 1B are butted together about a joint line 2. Small tabs of flat strip 3A and 3B are placed alongside each end of the joint line 2. A FSW tool 4 then traverses the joint line 2 while rotating counterclockwise, so that the two lengths 1A and 1B are joined together.

In this example embodiment, frictional heat is generated as the FSW tool traverses joint line 2, thereby causing the opposing portions of metal to temporarily enter a plasticized, deformable condition. While the tool 4 traverses joint line 2, resulting plasticized material is spread along joint line 2, thereby creating a weld 5.

In the depicted embodiment, FSW tool 4 begins its pass, moving across tab 3A, and traversing the joint line 2, and then completing the pass by traversing tab 3B. When FSW tool 4 traverses across tab/structure interface 11, an edge defect 6 is created on the resulting joined strip 13 on the advancing side of the FSW tool 4. Further, when the FSW tool 4 traverses across the tab/structure interface 12, an edge defect 7 is created on the resulting joined strip 13 on the retreating side.

Figure 3:
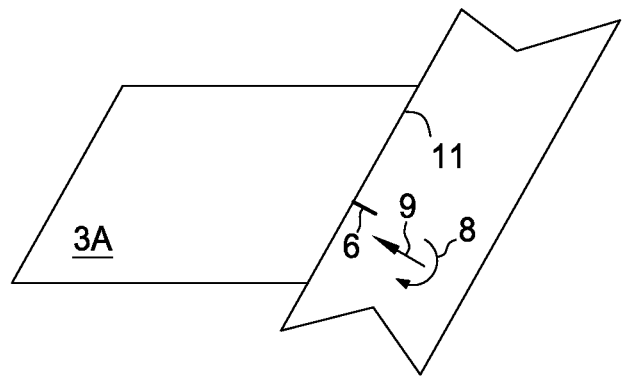
FIG. 3 is an illustration of a second FSW pass, performed to repair the edge defect created at the run-on tab/structure interface during the first pass; the FSW tool is rotated in a clockwise manner in the second pass.

In a further embodiment, FIG. 3 shows how a second-pass remedial weld is completed in order to initiate removal of the defects created during the first pass. In the depicted embodiment, a second FSW tool with a reverse spiral on the tool shoulder 8 is used. In one specific though non-limiting embodiment, the weld path 9 is offset by approximately 0.25 inch to the advancing side of the first weld.

In this embodiment, the second FSW tool 8 traverses through the sheet in a clockwise rotation. As the tool traverses the tab/structure interface 11, the tool advancing side draws metal across the tab/structure interface 11, towards the tab 3A, thus containing the edge defect 6 within the tab 3A. Correspondingly, on the tool 8 retreating side, no edge defect created, because the weld path 9 is within the weld metal created during the first weld pass 5.

Figure 4:
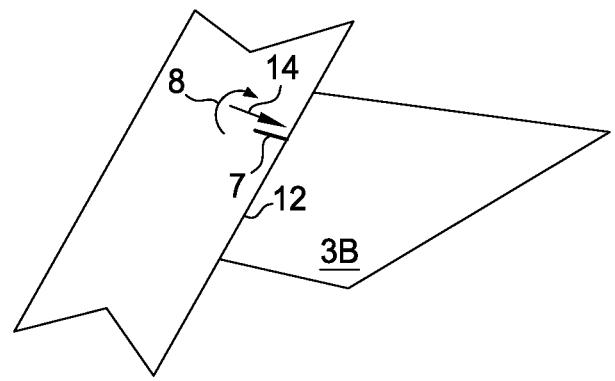
FIG. 4 is an illustration of the third FSW pass, performed to repair an edge defect created at the run-off tab/structure interface during the first pass; the FSW tool is again rotated in a clockwise manner.

The example embodiment of FIG. 4 shows how a third-pass friction stir weld is completed. In one specific though non-limiting embodiment, the weld path 14 is offset by approximately 0.3 inch toward the retreating side of the first weld pass 5. The FSW tool 8 again traverses through the strip in a clockwise rotation.

As the tool traverses the tab/structure interface 12, the tool advancing side draws metal into the tab 3B, thus containing the edge defect 7 within the tab 3B. Correspondingly, on the retreating side, the weld path 14 is within the weld metal created during the first weld pass 5; therefore, no defect is created in the resulting strip 13 (see FIG. 5).

Figure 5:
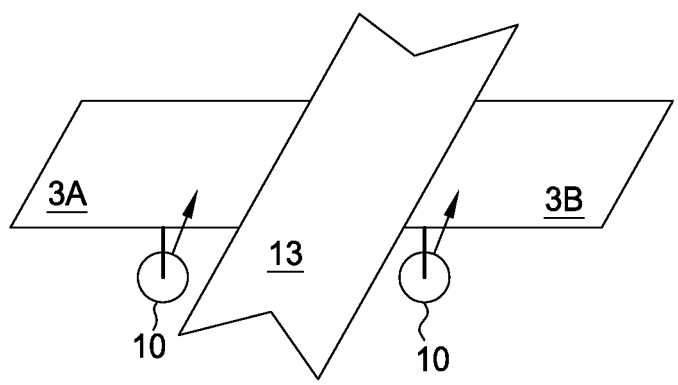
FIG. 5 depicts a machining of the longitudinal edges of the FSW joint, so that no weldment exists beyond the lateral edges of the flat strip stock.

After the three weld passes (or more, if additional iterations of the process are desired) are completed, the tabs 3A and 3B are removed, as illustrated in FIG. 5. Machine grinders 10 or the like are then used to smooth the longitudinal edges of the strip stock. All defects are contained within the tabs 3A and 3B, and no defects are found in the resulting strip 13.

In a further embodiment, the joined strip stock is subsequently rolled into a tube and seam welded, and in still further embodiments, the methods and means disclosed herein for seamlessly welding adjoining portions of metallic parent stock are applicable for a great many technical applications other than the manufacture of coiled tubing.

The foregoing specification is provided for illustrative purposes only, and is not intended to describe all possible aspects of the present invention. Moreover, while the invention has been shown and described in detail with respect to several exemplary embodiments, those of ordinary skill in the art will appreciate that minor changes to the description, and various other modifications, omissions, and additions may also be made without departing from the spirit or scope thereof.

The invention claimed is:

1. A method of manufacturing coiled tubing, said method comprising:
   a. aligning end portions of two sheets of metallic parent stock so that a flush seam is established therebetween, said seam comprising a portion of each of the two sheets of parent stock;
   b. attaching a run-on tab to a first side edge surface of each of the two sheets of aligned parent stock, thereby forming a first tab interface;
   c. attaching a run-off tab to a second side edge surface of each of the two sheets of aligned parent stock, thereby forming a second tab interface;
   d. making a first friction stir welding pass, traversing said first tab interface, said seam, and said second tab interface, using a tool rotating in a first rotational direction and moving in a first longitudinal direction, thereby causing said seam to temporarily plastically deform, wherein a first edge defect is formed on an advancing side of the first friction stir welding pass within one of the sheets of metallic parent stock adjacent to the first tab interface, and wherein a second edge defect is formed on an opposite retreating side of the first friction stir welding pass within the other one of the sheets of metallic parent stock adjacent to the second tab interface;
   e. making a second friction stir welding pass offset from the advancing side of the first friction stir welding pass but within weld metal created during the first friction stir welding pass, traversing only said first tab interface using a tool rotating in a second, opposite rotational direction and moving in a second, opposite longitudinal direction, while said seam remains plastically deformed, thereby removing the first edge defect;
   f. making a third friction stir welding pass offset from the opposite retreating side of the first friction stir welding pass but within weld metal created during the first friction stir welding pass, traversing only said second tab interface using a tool rotating in said second, opposite rotational direction and moving in the first longitudinal direction, while said seam remains plastically deformed, thereby removing the second edge defect; and
   g. allowing said seam to cool in such a manner that the two portions of parent stock metal are thereafter seamlessly joined.

2. The method of manufacturing coiled tubing of claim 1, wherein the first rotational direction is a counterclockwise rotation.

3. The method of manufacturing coiled tubing of claim 1, wherein the second, opposite rotational direction is a clockwise rotation.

4. The method of manufacturing coiled tubing of claim 1, wherein the tool moves toward the run-off tab in first longitudinal direction, and wherein the tool moves toward the run-on tab in the second, opposite longitudinal direction.

5. The method of manufacturing coiled tubing of claim 1, further comprising repeating steps a.-g. using at least one of the other end portions of at least one of the two sheets of metallic parent stock.

6. The method of manufacturing coiled tubing of claim 1, wherein said run-on tab and said run off tab are removed after said seam has cooled, and wherein said first side edges and said second side edges are thereafter machine finished.

7. The method of manufacturing coiled tubing of claim 1, wherein the second friction stir welding pass is offset from the advancing side of the first friction stir welding pass by about 0.25 inches.

8. The method of manufacturing coiled tubing of claim 1, wherein the third friction stir welding pass is offset from the retreating side of the first friction stir welding pass by about 0.30 inches.

* * * * *